United States Patent [19]

Stewart

[11] Patent Number: 5,105,313

[45] Date of Patent: Apr. 14, 1992

[54] METHOD AND APPARATUS FOR PRODUCING SLOW MOTION TELEVISION PICTURES

[75] Inventor: Ian M. Stewart, Ashmore Green, England

[73] Assignee: Quantel Limited, Newbury, England

[21] Appl. No.: 629,097

[22] Filed: Dec. 17, 1990

Related U.S. Application Data

[63] Continuation of Ser. No. 242,796, Sep. 9, 1988, abandoned.

[30] Foreign Application Priority Data

Sep. 26, 1987 [GB] United Kingdom ................ 8722704

[51] Int. Cl.[5] ............................................ H04N 5/783
[52] U.S. Cl. .................................... 360/10.3; 358/182
[58] Field of Search ............... 358/311, 22, 182, 160, 358/335, 342; 360/10.1, 10.3, 14.1, 14.3, 14.2

[56] References Cited

U.S. PATENT DOCUMENTS

| | | | |
|---|---|---|---|
| 4,339,775 | 7/1982 | Lemke et al. | 360/10.3 |
| 4,393,415 | 7/1983 | Hurst | 360/9.1 |
| 4,521,870 | 6/1985 | Babbel et al. | 360/14.1 |
| 4,549,173 | 10/1985 | Nakamura | 360/14.1 |
| 4,568,986 | 2/1986 | Furuhata et al. | 360/10.3 |
| 4,580,782 | 4/1986 | Ochi | 358/342 |
| 4,581,659 | 4/1986 | Azuma et al. | 360/10.2 |
| 4,612,569 | 9/1986 | Ichinose | 358/311 |
| 4,672,442 | 6/1987 | Yamaguchi et al. | 358/140 |
| 4,685,003 | 8/1987 | Westland | 360/14.1 |
| 4,688,105 | 8/1987 | Bloch et al. | 358/335 |
| 4,750,050 | 6/1988 | Belmares-Sarabia et al. | 358/311 |
| 4,752,836 | 6/1988 | Blanton et al. | 358/342 |
| 4,843,483 | 6/1989 | Bogner | 360/14.1 |

FOREIGN PATENT DOCUMENTS

| | | |
|---|---|---|
| 3613230 | 10/1986 | Fed. Rep. of Germany . |
| 2031687 | 4/1980 | United Kingdom . |
| 2129651 | 5/1984 | United Kingdom . |

OTHER PUBLICATIONS 62-35788, 2-87 Japanese English Abstract.
58-191586, 11-83 Japanese English Abstract.

Primary Examiner—Donald McElheny, Jr.
Attorney, Agent, or Firm—Cooper & Dunham

[57] ABSTRACT

A system for processing video signals to produce slow motion television pictures is disclosed. A sequence is produced of output frames at broadcast rate by combining a decreasing proportion of pixel values of a first frame (i) stored in a first frame store with an increasing proportion of fixed valves of a second frame (i+1) stored in a second frame store. On completing a cycle the second frame (i+1) is treated as the first frame and a new second frame (i+2) is provided from a third frame store.

14 Claims, 1 Drawing Sheet

000
METHOD AND APPARATUS FOR PRODUCING SLOW MOTION TELEVISION PICTURES

This is a continuation of application Ser. No. 242,796, filed Sept. 9, 1988 now abandoned.

BACKGROUND OF THE INVENTION

The present invention relates to a method and apparatus for producing slow motion television pictures.

A television picture is generated by displaying discrete video frames each consisting of two interlaced fields. The field rate is usually locked to the frequency of the alternating power supply, thus the US NTSC system displays 60 fields (30 frames) per second and the European PAL system displays 50 fields (25 frames per second). In addition to the video data, synchronising signals are also required to identify each line and field. Thus conventional television receivers require a field synchronising signal 50 or 60 times each second, referred to herein as the broadcast rate.

The problem of showing television pictures in slow motion is that the television receiver must still receive video frame data at the broadcast rate. A known system for satisfying this requirement operates by showing each frame more than once—thus the sequence of video images may be shown at half speed by playing a recording at half speed, writing each frame to a framestore and then reading each frame from the framestore twice at the broadcast rate. However a problem with this known system is that the illusion of movement soon becomes lost and the image is seen as discrete pictures no longer continuous over time.

SUMMARY OF THE INVENTION

It is an object of the present invention to provide an improved system for generating slow motion television pictures.

According to a first aspect of the invention there is provided a method of producing slow motion television pictures characterised by the steps of receiving a sequence of n video input frames at less than broadcast rate, performing a cycle of combining a decreasing proportion of a first frame with an increasing proportion of a second frame to produce a predetermined plurality (x) of output frames at broadcast rate, repeating said cycle for the second frame and a third frame, and so on until the cycle is performed on frame n−1 and frame n.

Thus in accordance with the first aspect of the invention a plurality of output frames are generated from each adjacent pair of frames in the original input sequence. Thus the output sequence may include frames which are identical to input frames but any additional intermediate frames will consist of varying proportions of the two frames. Thus, when portraying a moving object, each output frame will be unique thus improving the illusion of movement.

Preferably the extent to which the image is slowed down is controlled by a manually selectable speed reduction factor from which the number of frames produced during each cycle is calculated. Preferably said reduction factor is selected from a range which starts at a factor of one third wherein two intermediate output frames are produced for each adjacent pair of input frames.

According to a second aspect of the invention there is provided slow motion apparatus for television pictures, characterised by comprising means for supplying a sequence of n video input frames at less than broadcast rate to a processing means, wherein said processing means: performs a cycle of combining a decreasing proportion of a first frame with an increasing proportion of a second frame to produce a predetermined plurality (x) of output frames at broadcast rate, repeats said cycle for the second and third frames, and continues to repeat said cycle for new input frames until x output frames have been produced from input frames n−1 and n.

Preferably the apparatus includes means for controlling the speed of a mechanical storage device in response to the selected factor.

DESCRIPTION OF THE PREFERRED EMBODIMENT

Figure 1:
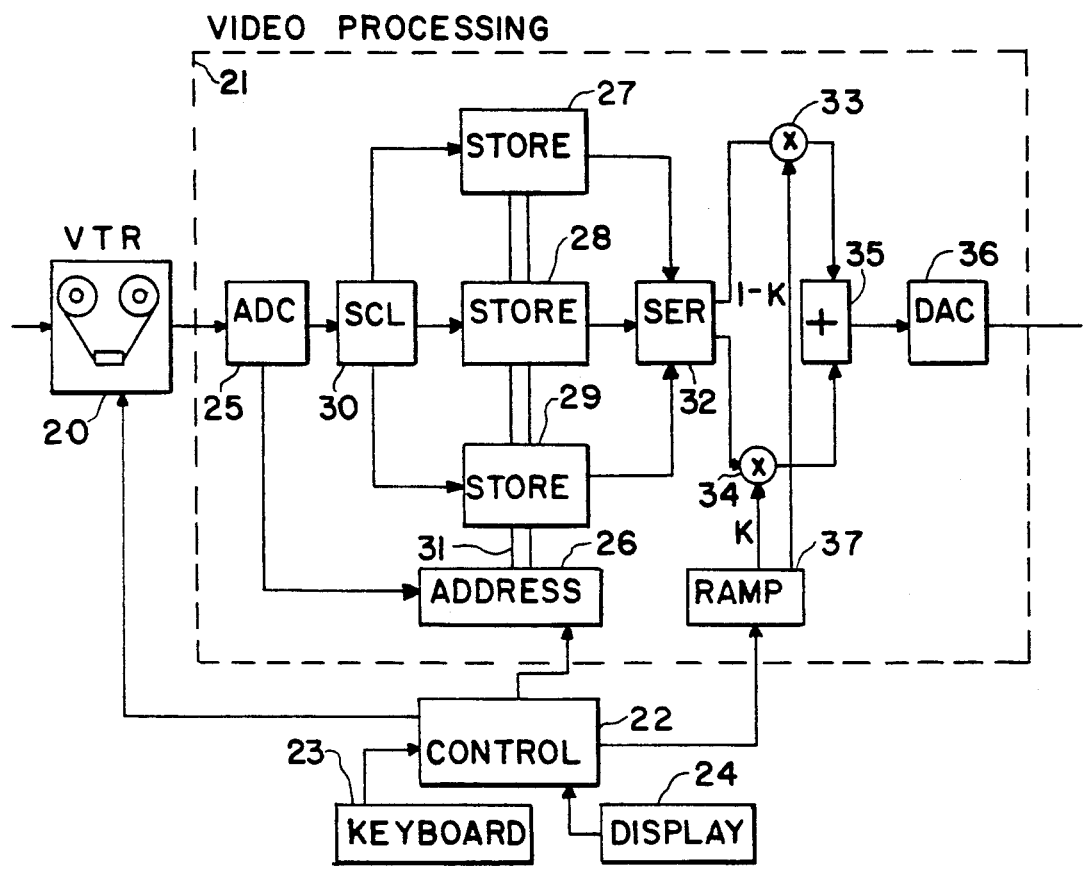
FIG. 1 shows a system for recording television pictures and replaying said pictures in slow motion; and, FIG. 2 shows how the system shown in FIG. 1 produces output frames from recorded input frames.

A system for recording television pictures and then replaying them in slow motion is shown in FIG. 1. Component analogue video signals (i.e. having a luminance value and two colour difference components) are generated by a camera, or similar video source, and supplied to a video tape recorder 20. On playback the video signal is supplied to a video processing unit 21 at normal speed, unless speed control data is supplied from a control unit 22.

The tape recorder 20 is driven by a servo drive-motor allowing accurate speed control. The tape includes a reference track carrying a signal at a fixed predetermined frequency the frequency of which is then compared with that of a reference signal generated within the machine and any differences result in an error signal being produced which in turn controls the speed of the drive motor. Thus the effect of supplying speed control data to the recorder 20 from the control unit 22 is to adjust the internally generated reference signal.

Operator control is achieved by means of a keyboard 23 and a visual display unit 24 interfaced to the control unit 22. The keyboard is used to select the "slow motion" mode of operation and to define a speed reduction factor. Then, in response to a command (from the keyboard 23) instructing the machine to run, control signals are supplied to the tape recorder 20 and processing unit 21.

The processing unit 21 includes an analogue to digital converter 25 which samples the analogue components supplied from the tape recorder to produce a digital video signal conforming to the 4:2:2 digital standard —i.e. luminance is sampled at 13.5 MHz and eight bits are generated per sample. The convertor 25 also removes synchronising signals from the video input and supplies these to an addressing circuit 26. Each frame of video data from converter 25 is then written to one of three framestores 27, 28 or 29 via an input framestore selector 30, selection being controlled by control unit 22. The writing of video data to the framestores 27–29, and the reading of data from said framestores, is controlled by the addressing circuit 26 which supplies addressing signals via busses 31. The addressing circuit 26 receives control signals from the control circuit 22 instructing it as to which stores to address and at what rate; the stores being written to at a slower rate, than that at which they are read from, during slow motion operation.

The system is arranged to generate a plurality of output frames at broadcast rate from each adjacent pair of input frames. The procedure for each adjacent pair is substantially the same (assuming the reduction factor remains constant) and is referred to as a cycle. For each cycle two framestores are addressed in parallel and the pixel values read therefrom are supplied to an output framestore selector 32. Three stores are provided so that one may be written to while the other two are being read at broadcast rate.

At any instant of the video input sequence, we may assume that frame i+2 is being played and written to, say, framestore 29 via converter 25. Frame i was written to framestore 27 two cycles ago and during the last cycle frame i+1 was written to framestore 28. In addition to writing frame i+2, the addressing circuit 26 is also arranged to read frames i and i+1 from, at this instant, framestores 27 and 28 respectively. The output framestore selector is therefore arranged to supply the output from framestore 27 (containing frame i) to a descending multiplier 33 and the output from framestore 28 (frame i+1) to an ascending multiplier 34. On the next cycle frame i is overwritten by frame i+3, frame i+1 is read again (but this time selector 32 supplies it to the descending multiplier 33) while frame i+2 (from store 29) is supplied to the ascending multiplier 34. Thus each framestore continually repeats three cycles, in which it receives frame data at less than broadcast rate for the first cycle, supplies data to the ascending multiplier 34 for the second and then supplies data to the descending multiplier 33 for the third.

Multipliers 33 and 34 are referred to as descending and ascending respectively because their other input receives a descending or ascending digital ramp. The number of levels in said ramps will depend on the selected speed reduction factor but the value $(1-k)$ supplied to the descending multiplier is always the inverse of the value $(k)$ supplied to the ascending multiplier. Furthermore, for each cycle, k always starts with the value zero, for which an output frame is produced. Slow motion is created by producing intermediate frames in which k has a value between zero and unity.

The multipliers 33 and 34 multiply each pixel from their respective frame by $1-k$ and k for each operating cycle. Each pair of pixels, from similar positions in their respective frames, are then combined by an adder 35 and the resulting digital frames are converted to an analogue signal by a digital to analogue converter 36. Converter 36 also adds synchronising signals to give an output video signal with frames at the broadcast rate. The digital ramps are supplied to multipliers from a ramp generator 37 which is programmed by the control unit 22.

Figure 2:
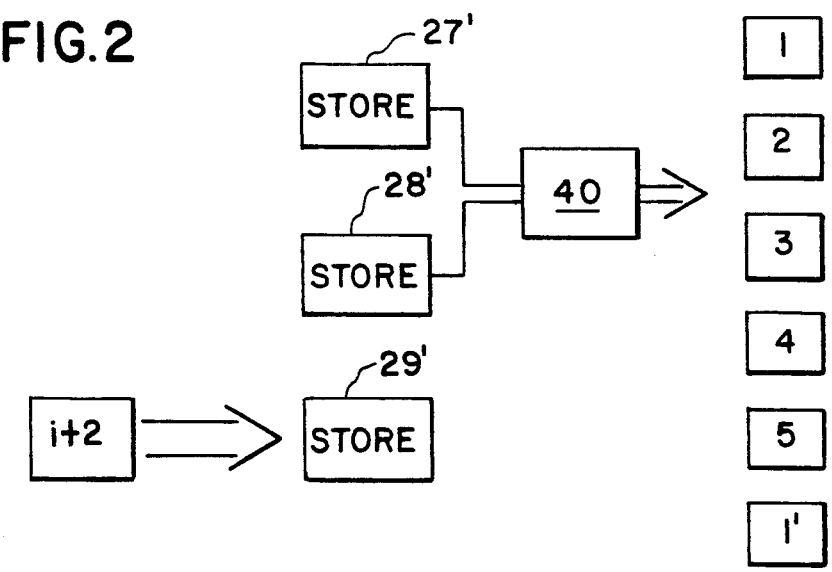

Operation of the system shown in FIG. 1 may be considered with reference to FIG. 2 which shows one cycle when operating at one fifth normal speed. In response to a prompt displayed on the display unit 24 an operator selects the slow motion mode of operation and then enters the speed reduction factor x, in this case x equals one fifth. Checks may then be made to ensure that the tape recorder 20 has been loaded with tape, or rewound etc, after which the display unit instructs the operator that the machine is ready.

On instructing the machine to "RUN", via the keyboard 23, the control unit programs the speed control of the tape recorder 20, the addressing circuit 26 and the digital ramp generator 37 with data relevant to a one fifth speed reduction.

The tape recorder is programmed such that the frequency of its internal reference signal is reduced to one fifth that of normal operation. The drive motor then runs at one fifth normal speed and the input sequence of video frames are supplied to converter 25 at one fifth broadcast rate. Digital pixels of the first frame are written to framestore 27 via the input framestore selector 30 under the control of the addressing circuit 26. The second frame is then written to framestore 28 and then it is not until the start of the third cycle, when frame 3 is written to framestore 29, that the first output frame can be produced.

On the start of the third cycle the addressing circuit addresses store 29 at one fifth broadcast rate (to effect writing of frame 3) and addresses framestores 27 and 28 at normal broadcast rate. Thus while frame 3 is written to store 29 frames 1 and 2 are read five times from stores 27 and 28. This is shown schematically in FIG. 2 in which multipliers 33 and 34, and adder 35 are represented by box 40.

The ramp generator has been programmed to generate ramps having five levels of equal spacing—i.e. the value of k increases linearly over the ramp. The generator may then be arranged to calculate the values of k or values may be calculated by the control unit 22 and downloaded to the ramp generator. As frames 27 and 28 are being read, frame 1 is supplied to the descending multiplier 33 and each pixel value is multiplied by $1-k$. Similarly the pixel values from frame 2 are each multiplied by k in the ascending multiplier 34.

With a reduction factor of one fifth, each cycle produces five output frames, numbered 1 to 5 in FIG. 2. For the first frame $k=0$ and $k-1=1$ therefore this frame is identical to the first frame of the input sequence. For frame 2, $K=0.2$ $(1-k=0.8)$; for frame 3, $K=0.4$; $K=0.6$ for frame 4 and finally $k=0.8$ for frame 5. The next frame could be generated by setting $k=1$ but this frame is generated from the start of the next cycle, the frame data is supplied to the descending multiplier and an output generated from $1-k=0$.

What is claimed is:

1. A method of producing slow motion television pictures, the method comprising the steps of:

receiving a sequence of input video frames representing a scene and including at least a first frame representing a scene at a first instant and a second frame representing the scene at a later instant;

performing a cycle of combining a proportion of the first frame with a proportion of the second frame to produce a predetermined plurality of output frames representing the scene at a series of instants in a period from said first instant to said later instant, the proportions of each frame combined to produce said output frames being related to the order of the respective output frame in said series, with the proportion of the first frame decreasing and the proportion of the second frame increasing as the cycle progresses; and outputting the plurality of output frames at a display rate for display over a total period which is longer than the period from said first instant to said later instant, thereby causing motion in said scene displayed by said plurality of output frames to be slower than the motion in said scene represented by said sequence of input video frames.

2. A method as claimed in claim 1, comprising the steps of manually selecting a reduction factor, and calculating from the selected factor the number of plural output frames produced by the cycle.

3. A method as claimed in claim 2, wherein the reduction factor is selected from a range of predefined factors.

4. A method as claimed in claim 3, wherein the range of factors starts at a factor of one third such that two intermediate output frames are produced for display in the period between said first instant and said second instant.

5. A method as claimed in claim 2, wherein the sequence of input frames is stored on a mechanically moving medium and the speed of movement of said medium is controlled in response to said factor.

6. A method as claimed in claim 1, wherein the proportion of the first frame is increased and the proportion of the second frame is decreased linearly in steps corresponding to the reciprocal of the number of output frames per cycle.

7. Apparatus for use in producing slow motion television pictures, the apparatus comprising:
   a receiver for receiving a sequence of input video frames representing a scene, said sequence including at least a first frame representing a scene at a first instant and a second frame representing the scene at a later instant;
   processing means for performing a cycle of combining a proportion of the first frame with a proportion of the second frame to produce a predetermined plurality of output frames representing the scene at a series of instants in a period from said first instant to said later instant, the proportions of each frame combined to produce said output frames being related to the order of the respective output frame in said series, with the proportion of the first frame decreasing and the proportion of the second frame increasing as the cyclic process progresses; and
   output means for outputting the plurality of output frames at a display rate for display over a total period which is longer than the period from said first instant to said later instant, the apparatus thereby causing motion in said scene displayed by said plurality of output frames to be slower than the motion in said scene represented by said sequence of input video frames.

8. Apparatus as claimed in claim 7, comprising selecting means for manually selecting a speed reduction factor and means for calculating from the selected factor the number of plural output frames produced during each cycle.

9. Apparatus as claimed claim 8, wherein the selecting frames enables a factor to be selected from a range of predefined factors.

10. Apparatus as claimed in claim 9, wherein the range of factors starts at a factor of one third such that two intermediate output frames are produced by the processing means for display in the period between said first instant and said later instant.

11. Apparatus as claimed in claim 8, comprising a mechanical storage device including a moving medium for storing the sequence of input frames and controlling means for controlling the speed of movement of the mechanical storage device in response to said selected factor.

12. Apparatus as claimed in claim 7, comprising frame storage means for storing said first frame and said second frame as digitally encoded pixels and wherein a decreasing proportion of the first frame is combined with an increasing proportion of the second frame in incremental steps on a pixel-by-pixel basis as said cyclic process proceeds.

13. Apparatus as claimed in claim 12, comprising means for calculating values of the increasing factor in a range between zero and unity, means for calculating values of the decreasing factor in a range between unity and zero, means for multiplying the pixel values of the first frame with the respective value of the decreasing factor, means for multiplying the pixel values of the second frame by the respective value of the increasing factor, and means for combining the result of each of said multiplications on a pixel-by-pixel basis to produce output pixels for display.

14. A system for use in producing slow motion television pictures, the system comprising:
   a video tape recorder for storing a sequence of video frames representing the scene at a first instant, a second frame representing the scene at a later instant and a third frame representing the scene at an instant later than that of the second frame;
   manually operable selecting means for selecting a speed reduction factor; and
   a processing unit for receiving the sequence of video frames from said tape recorder and for performing a cyclic process of combining a proportion of the first frame with a proportion of the second frame to produce a preselected plurality of output frames representing the scene at a series of instants in a period from said first instant to said later instant, the number of the preselected plurality of frames being determined by the selected speed reduction factor, and the proportions of each frame combined to produce said output frames being related to the order of the respective output frame in said series with the proportion of the first frame decreasing and the proportion of the second frame increasing as the cyclic process progresses, the processing unit being arranged to repeat said cyclic process for said second and said third frame and for subsequent frames in the sequence and being arranged to output the preselected plurality of output frames at a display rate for display over a total period which is longer than the period between two frames of the sequence thereby causing motion in said sequence displayed by said plurality of output frames to be slower than the motion in said sequence represented by said sequence of input video frames.

* * * * *